US012327699B2

(12) United States Patent
Tamura et al.

(10) Patent No.: US 12,327,699 B2
(45) Date of Patent: Jun. 10, 2025

(54) KEYBOARD ASSEMBLY, DEVICE FRAMEWORK, AND ELECTRONIC DEVICE

(71) Applicant: Huawei Technologies Co., Ltd., Guangdong (CN)

(72) Inventors: Fumio Tamura, Yokohama (JP); Yake Zou, Dongguan (CN); Ryo Otsuka, Yokohama (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 18/171,472

(22) Filed: Feb. 20, 2023

(65) Prior Publication Data

US 2023/0207235 A1 Jun. 29, 2023

Related U.S. Application Data

(63) Continuation of application No. PCT/CN2021/103858, filed on Jun. 30, 2021.

(30) Foreign Application Priority Data

Aug. 21, 2020 (CN) ......................... 202010851512.4

(51) Int. Cl.
*H01H 13/14* (2006.01)
*H01H 13/20* (2006.01)
*H01H 13/705* (2006.01)

(52) U.S. Cl.
CPC .......... *H01H 13/705* (2013.01); *H01H 13/14* (2013.01); *H01H 13/20* (2013.01)

(58) Field of Classification Search
CPC ............... H01H 13/705; H01H 13/702; H01H 13/7057; H01H 13/7065; H01H 13/14;
(Continued)

(56) References Cited

U.S. PATENT DOCUMENTS 10,170,253 B2 * 1/2019 Liu ........................ H01H 3/125
10,401,970 B1 * 9/2019 Chen .................... H01H 13/705
(Continued)

FOREIGN PATENT DOCUMENTS

CN 1452046 A 10/2003
CN 201435046 Y 3/2010
(Continued)

*Primary Examiner* — William A Bolton
(74) *Attorney, Agent, or Firm* — WOMBLE BOND DICKINSON (US) LLP

(57) ABSTRACT

Provided herein is a keyboard assembly that includes a keyboard substrate, a plurality of keycaps, and a plurality of lifting supports. Each keycap is connected to the keyboard substrate by using a lifting support. The keyboard substrate is connected to a bottom plate and a top plate, with the bottom plate including a key accommodation groove that further includes a concave slope. The lifting support is located in the key accommodation groove, with one end abutting against the concave slope and being capable of sliding on the concave slope. In a process in which the top plate rotates to a first specified location, the keyboard substrate is driven to move, the lifting support descends, and the keycap descends. In a process in which the top plate rotates to a second specified location, the keyboard substrate is driven to move.

20 Claims, 14 Drawing Sheets

(58) Field of Classification Search
CPC .......... H01H 13/20; H01H 3/12; H01H 3/125; H01H 2221/056; H01H 2221/068; H01H 2227/028; H01H 2227/036; H01H 2231/002; G06F 3/0202
USPC ...................... 200/341, 314, 5 A, 279, 50.36
See application file for complete search history.

(56) References Cited

U.S. PATENT DOCUMENTS

| | | | | |
|---|---|---|---|---|
| 10,460,891 | B2 * | 10/2019 | Kano | G06F 1/1662 |
| 10,468,211 | B2 * | 11/2019 | Leong | H01H 13/86 |
| 10,509,482 | B1 * | 12/2019 | Tsai | G06F 3/0202 |
| 2016/0155582 | A1 * | 6/2016 | Peng | H01H 13/88<br>29/622 |
| 2019/0244772 | A1 * | 8/2019 | Wang | G06F 1/1662 |
| 2019/0377389 | A1 | 12/2019 | Tamura et al. | |

FOREIGN PATENT DOCUMENTS

| | | | |
|---|---|---|---|
| CN | 204632606 | U | 9/2015 |
| CN | 204668212 | U | 9/2015 |
| CN | 105428123 | A | 3/2016 |
| CN | 106249810 | A | 12/2016 |
| CN | 107305816 | A | 10/2017 |
| CN | 110047682 | A | 7/2019 |
| JP | 2018010422 | A | 1/2018 |

* cited by examiner

KEYBOARD ASSEMBLY, DEVICE FRAMEWORK, AND ELECTRONIC DEVICE

CROSS-REFERENCE TO RELATED APPLICATIONS

This application is a continuation of International Application No. PCT/CN2021/103858, filed on Jun. 30, 2021, which claims priority to Chinese Patent Application No. 202010851512.4, filed on Aug. 21, 2020. The disclosures of the aforementioned applications are hereby incorporated by reference in their entireties.

TECHNICAL FIELD

This application relates to the field of terminal technologies, and in particular, to a keyboard assembly, a device framework, and an electronic device.

BACKGROUND

In recent years, as a notebook computer is miniaturized and thinned, a keyboard has a smaller size and becomes thinner, and a thickness of the keyboard directly affects a key travel distance. This poses a higher challenge to maintain and improve a keystroke feeling. Therefore, in a trend of miniaturization of a terminal product, it is of great significance to ensure a key travel distance long enough to provide a keyboard with a comfortable operation for a consumer.

In a conventional technology, a keyboard with a flat appearance and a continuous keyboard surface structure is usually used. In the keyboard, a corner of a keycap is pressed by using a hook fastened onto a steel wire, and the keycap ascends or descends by rotating the hook. When a key is not used, the hook is driven by rotating the steel wire, to press the key to sink to a location flush with a keyboard surface, and the keyboard surface is entirely presented as a plane, to improve an aesthetic of an appearance and a feeling of the consumer. When the key is used, the hook is reversely flipped to release pressure, and the keycap ascends to a required height. Such a structure can be used to ensure that even a thin computer can have a key travel distance long enough. However, to manufacture the keyboard, a material and mechanism with a high friction coefficient need to be used, and a steel wire and a hook need to be welded for all keys, to increase a quantity of parts, and increase an overall weight and costs.

SUMMARY

In view of this, this application provides a keyboard assembly that has a thin shape, a long key travel distance, a simplified overall structure, and reduced manufacturing costs.

A device framework to which the keyboard assembly is applied also needs to be provided.

An electronic device including the device framework also needs to be provided.

According to a first aspect of embodiments of this application, a keyboard assembly is provided, including a keyboard substrate, a keycap array including a plurality of keycaps, and a lifting support array including a plurality of lifting supports one-to-one corresponding to the keycaps, where each keycap is connected to the keyboard substrate by using a lifting support corresponding to the keycap; the keyboard substrate is configured to be connected to one bottom plate and one top plate; the top plate is rotatably connected to the bottom plate; the bottom plate includes a plurality of key accommodation grooves one-to-one corresponding to the plurality of keycaps; each key accommodation groove includes a concave slope; the lifting support is located in the key accommodation groove; one end of the lifting support abuts against the concave slope and is capable of sliding on the concave slope; and in a process in which the top plate rotates to a first specified location relative to the bottom plate, the top plate drives the keyboard substrate to move relative to the bottom plate, so that each lifting support slides in a first direction on the concave slope, and each lifting support descends, to drive each keycap to descend; in a process in which the top plate rotates to a second specified location relative to the bottom plate, the top plate drives the keyboard substrate to move relative to the bottom plate, so that each lifting support slides in a second direction on the concave slope, and each lifting support ascends, to drive each keycap to ascend, thereby increasing a key travel distance of the keycap; and a direction in which the top plate rotates to the first specified location is opposite to a direction in which the top plate rotates to the second specified location.

In this case, in the keyboard assembly, the top plate rotates, to push or pull the keyboard substrate to perform translation, and one end of the lifting support and the concave slope of the key accommodation groove press each other to generate a relative displacement, so that the lifting support is longitudinally stretched or retracted, to drive the keycap to ascend or descend, thereby obtaining a keyboard assembly having a stable movement, a thin shape, and a long key travel distance. In addition, in the keyboard assembly provided in this application, a small quantity of simple components are used to enable the keycap to ascend or descend, to simplify an overall structure of the keyboard assembly or a device framework, and further reduce an overall weight and manufacturing costs of the keyboard assembly or the device framework.

In an implementation of this application, when the top plate rotates relative to the bottom plate, the bottom plate remains stationary, and the top plate drives the keyboard substrate to move relative to the bottom plate. In this case, the keyboard assembly having a stable movement, a thin shape, and a long key travel distance can be obtained, an overall structure of the keyboard assembly or a device framework is simplified, and an overall weight and manufacturing costs of the keyboard assembly or the device framework are further reduced.

In an implementation of this application, a rotating shaft structure is disposed on one side of the top plate, and the top plate is connected to each of the bottom plate and the keyboard substrate by using the rotating shaft structure. In this case, when the top plate rotates relative to the bottom plate, the rotating shaft structure can be used to enable a smoother movement between the keyboard substrate and the bottom plate.

In an implementation of this application, the keyboard substrate further includes a plurality of clamping assemblies, each clamping assembly includes two first clamping members and two second clamping members, the lifting support includes a first mount and a second mount connected to the first mount, one end of the first mount is connected to the first clamping member, one end of the second mount abuts against the keyboard substrate and is capable of sliding on the keyboard substrate, one end of the second mount can be connected to the second clamping member when one end of the second mount slides to the second clamping member, the other end of the first mount abuts against the keycap and is capable of sliding on the keycap, and the other end of the second mount is connected to the keycap. The first clamping member, the second clamping member, the first mount, and the second mount are disposed, so that a connection between the lifting support and the keyboard substrate is more proper, the lifting support ascends or descends as the keyboard substrate moves, and the keycap ascends or descends as the lifting support ascends or descends.

In an implementation of this application, two side plates are disposed on the first mount; each side plate is wedge-shaped and includes a protruding corner; the protruding corner abuts against and matches the concave slope; in the process in which the top plate rotates to the first specified location relative to the bottom plate, the top plate drives the keyboard substrate to move relative to the bottom plate, so that each protruding corner slides in the first direction on the concave slope; and in the process in which the top plate rotates to the second specified location relative to the bottom plate, the top plate drives the keyboard substrate to move relative to the bottom plate, so that each protruding corner slides in the second direction on the concave slope. The protruding corner matches the top plate and the concave slope, so that the keycap ascends when the lifting support ascends.

In an implementation of this application, the bottom plate further includes a keyboard surface, and when the top plate is at the first specified location, the keycap is accommodated in the key accommodation groove and is at least lower than or flush with the keyboard surface of the bottom plate. In this case, it is possible to avoid a case in which the keycap and a screen interfere with each other and the screen is damage, to obtain a keyboard assembly having a flat keyboard appearance surface.

In an implementation of this application, a plurality of first limiting holes are further formed on the keyboard substrate, an extension direction of a long side of the first limiting hole is the same as a movement direction of the keyboard substrate, a limiting member sequentially passes through the first limiting hole and the bottom plate, to slidably connect the keyboard substrate and the bottom plate, and the limiting member slides in the first limiting hole relative to the keyboard substrate when the top plate rotates between the first specified location and the second specified location. In this case, the keyboard substrate and the bottom plate may be slidably connected together, and the pad and the keyboard substrate are limited.

In an implementation of this application, one folding side is disposed on each of two short sides of the first limiting hole, a pad is disposed on the two folding sides, the pad is provided with a second limiting hole, an extension direction of a long side of the second limiting hole is the same as the extension direction of the long side of the first limiting hole, the limiting member sequentially passes through the first limiting hole, the second limiting hole, and the bottom plate, to slidably connect the keyboard substrate and the bottom plate, and the limiting member slides in the second limiting hole relative to the keyboard substrate when the top plate rotates between the first specified location and the second specified location. In this case, not only movement precision of the keyboard substrate can be ensured, but also smoothness of a relative movement between the keyboard substrate and the bottom plate can be ensured.

In an implementation of this application, the limiting member includes a limiting portion and a fastening portion vertically fastened onto the limiting portion, a cross-sectional dimension of the limiting portion is greater than a cross-sectional dimension of the fastening portion, the cross-sectional dimension of the limiting portion is greater than a cross-sectional dimension of a short side of the second limiting hole, and the cross-sectional dimension of the fastening portion is less than the cross-sectional dimension of the short side of the second limiting hole. In this case, not only movement precision of the keyboard substrate can be ensured, but also smoothness of a relative movement between the keyboard substrate and the bottom plate can be ensured.

In an implementation of this application, the keycap includes at least one fastening block and two third clamping members, a first connecting shaft is further disposed on the first mount, two ends of the first connecting shaft are separately slidably connected to the third clamping member, two third clamping shafts are further disposed on the second mount, and the third clamping shaft is connected to the fastening block. In this case, a connection between the lifting support and the keycap can be more proper.

In an implementation of this application, a first clamping shaft is disposed on the first mount, two second clamping shafts are further disposed on the second mount, two ends of the first clamping shaft are connected to the two first clamping members, and the second clamping shaft is slidably connected to the second clamping member. In this case, a connection between the lifting support and the keyboard substrate can be more proper.

According to a second aspect of embodiments of this application, a device framework is provided. The device framework includes a top plate, a bottom plate, and the keyboard assembly as described above. In this case, a keyboard assembly having a stable movement, a thin shape, and a long key travel distance can be obtained, an overall structure of the keyboard assembly or a device framework is simplified, and an overall weight and manufacturing costs of the keyboard assembly or the device framework are further reduced.

According to a third aspect of embodiments of this application, an electronic device is provided, including a screen. The electronic device further includes the device framework as described above, the screen is disposed on a top plate and faces a keyboard assembly, and the screen is connected to the device framework in a wired manner or a wireless manner. In this case, a keyboard assembly having a stable movement, a thin shape, and a long key travel distance can be obtained, an overall structure of the keyboard assembly or the device framework is simplified, and an overall weight and manufacturing costs of the keyboard assembly or the device framework are further reduced.

DESCRIPTION OF SYMBOLS OF MAIN ELEMENTS

Figure 1:
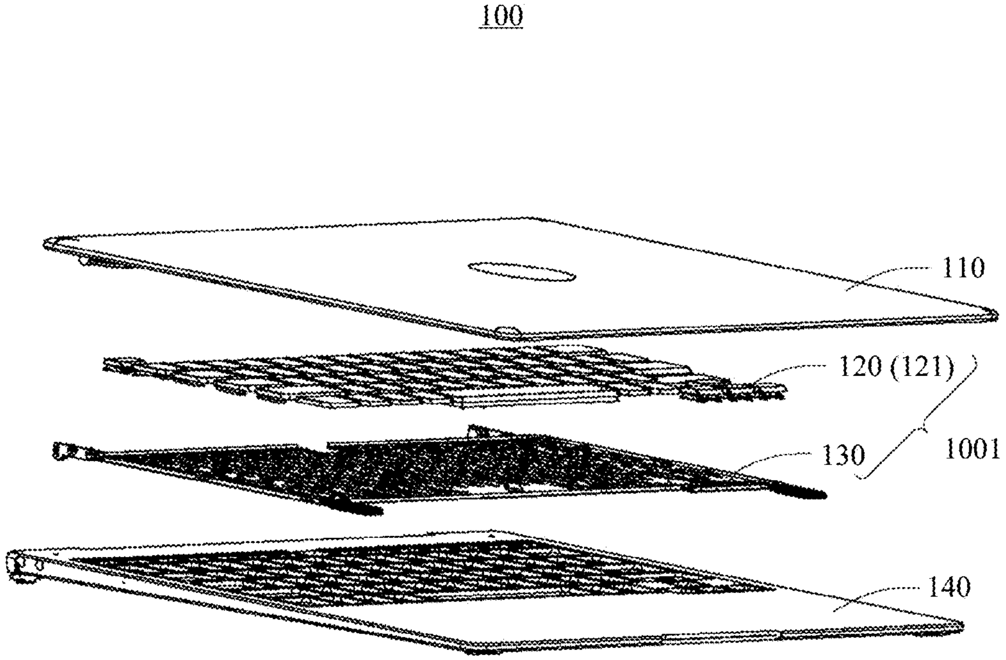
FIG. 1 is an exploded diagram of a device framework according to an implementation of this application.

| | |
|---|---|
| Device framework | 100 |
| Top plate | 110 |
| Rotating shaft structure | 10 |
| Shaft sleeve | 11 |
| Rotating shaft | 12 |
| Eccentric protrusion | 13 |
| Keyboard assembly | 1001 |
| Keycap array | 120 |
| Lifting support array | 121 |
| Keycap | 210 |
| First surface | 211 |
| Second surface | 212 |
| Fastening block | 213 |
| Second clamping slit | 2131 |
| Limiting groove | 214 |
| Third clamping member | 215 |
| First accommodation groove | 216 |
| Lifting support | 220 |
| First mount | 22 |
| First side wall | 221 |
| Second side wall | 222 |
| Third side wall | 223 |
| Fourth side wall | 224 |
| First clamping shaft | 225 |
| First connecting shaft | 226 |
| Side plate | 227 |
| Protruding corner | 2271 |

-continued

| | |
|---|---|
| First accommodation chamber | 228 |
| Pin shaft hole | 229 |
| Protruding block | 2231 |
| Second mount | 23 |
| Second accommodation groove | 231 |
| Third accommodation groove | 232 |
| Second clamping shaft | 233 |
| Third clamping shaft | 234 |
| Pin shaft | 235 |
| Keyboard substrate | 130 |
| Metal plate | 131 |
| Thin film circuit layer | 132 |
| Backlight film layer | 133 |
| Third ani-interference cut | 134 |
| Connecting arm | 31 |
| Arc slot | 311 |
| Main body portion | 32 |
| Keyboard substrate body | 321 |
| Protruding edge | 322 |
| Clamping assembly | 33 |
| First clamping member | 331 |
| Second clamping member | 332 |
| First ani-interference cut | 34 |
| Second ani-interference cut | 35 |
| First limiting hole | 36 |
| Folding side | 361 |
| Pad | 37 |
| Second limiting hole | 371 |
| Gap | 372 |
| Limiting member | 38 |
| Limiting portion | 381 |
| Fastening portion | 382 |
| Bottom plate | 140 |
| Key accommodation groove | 41 |
| Concave slope | 411 |
| Keyboard surface | 42 |

Embodiments of the present invention are further described with reference to the accompanying drawings.

DESCRIPTION OF EMBODIMENTS

To further describe the technical means and efficacy of this application to achieve the predetermined application objective, the following describes in detail specific implementations, structures, features, and efficacy of a keyboard assembly, a keyboard, and an electronic device provided in this application with reference to FIG. 1 to FIG. 19 and preferred implementations. It is clear that the described embodiments are merely some but not all of embodiments of this application. All other embodiments obtained by a person of ordinary skill in the art based on embodiments of this application without creative efforts shall fall within the protection scope of this application.

It should be noted that when an element is considered to be "connected" to another element, the element may be directly connected to the another element, or there may be an element disposed in the middle. When an element is considered to be "disposed" on another element, the element may be directly disposed on the another element, or there may be an element disposed in the middle.

Unless otherwise defined, all technical and scientific terms used in this specification have a same meaning as that commonly understood by a person skilled in the art of this application. The terms used in this specification are merely for the purpose of describing specific embodiments, and are not intended to limit this application. The term "and/or" used in this specification includes any and all combinations of one or more associated listed items.

An embodiment of this application provides a device framework, including a keyboard assembly, a top plate, and a bottom plate. The keyboard assembly includes a keyboard substrate, a keycap array including a plurality of keycaps, and a lifting support array including a plurality of lifting supports one-to-one corresponding to the keycaps. Each keycap is connected to the keyboard substrate by using a lifting support corresponding to the keycap. The keyboard substrate is connected to the bottom plate, and the keyboard substrate is capable of sliding relative to the bottom plate. The bottom plate includes a plurality of key accommodation grooves one-to-one corresponding to the plurality of keycaps, each key accommodation groove includes a concave slope, the lifting support is located in the key accommodation groove, and one end of the lifting support abuts against the concave slope and is capable of sliding on the concave slope. The keyboard substrate is connected to the top plate, and the top plate is rotatably connected to the bottom plate. In a process in which the top plate rotates to a first specified location relative to the bottom plate, the top plate drives the keyboard substrate to move relative to the bottom plate, so that each lifting support slides in a first direction on the concave slope, and each lifting support descends, to drive each keycap to descend. In a process in which the top plate rotates to a second specified location relative to the bottom plate, the top plate drives the keyboard substrate to move relative to the bottom plate, so that each lifting support slides in a second direction on the concave slope, and each lifting support ascends, to drive each keycap to ascend. A direction in which the top plate rotates to the first specified location is opposite to a direction in which the top plate rotates to the second specified location.

Herein, the "first specified location" is a location at which the top plate is located when an unfolding angle of the top plate relative to the keyboard substrate is 0 degrees, in other words, when the top plate is closed; and the "second specified location" is a location at which the top plate is located when the unfolding angle of the top plate relative to the keyboard substrate is 90 degrees.

It can be learned from the description that the lifting support provided in this implementation can realize a function of providing power for the keycap to ascend or descend. To realize the foregoing function, the lifting support needs to be implemented through matching between the top plate, the keyboard substrate, and the bottom plate. The top plate, the keyboard substrate, and the bottom plate may be implemented by using different structures, and are described in detail below with reference to the accompanying drawings and specific implementations for each of understanding.

Refer to FIG. 1. An embodiment of this application provides a device framework 100. The device framework 100 is applied to an electronic device. The electronic device may be a common terminal such as a desktop computer or a notebook computer in the conventional technology, or may be a device that is externally connected to a wired or wireless keyboard or a mobile phone connected to a keyboard. In an embodiment, the device framework 100 is a device framework applied to a notebook computer. In an embodiment, the electronic device includes a device framework 100 and a screen disposed on the device framework 100. In another implementation, the screen may not be disposed on the device framework 100, and the screen and the device framework 100 may be connected in a wired or wireless manner.

Refer to FIG. 1. The device framework 100 includes a top plate 110, a keyboard assembly 1001, and a bottom plate 140.

The keyboard assembly 1001 includes a keyboard substrate 130, a keycap array 120 including a plurality of keycaps 210, and a lifting support array 121 including a plurality of lifting supports 220 one-to-one corresponding to the keycaps 210. Each keycap 210 is connected to the keyboard substrate 130 by using a lifting support 220 corresponding to the keycap 220. The keyboard substrate 130 is connected to the bottom plate 140 and is capable of sliding relative to the bottom plate 140. The keyboard substrate 130 is connected to the top plate 110, and the top plate 110 is rotatably connected to the bottom plate 140.

The top plate 110 is configured to provide power for the keycap array 120 to ascend or descend.

In an embodiment, the screen of the electronic device is fastened onto the top plate 110 and faces the keycap array 120.

Figure 2:
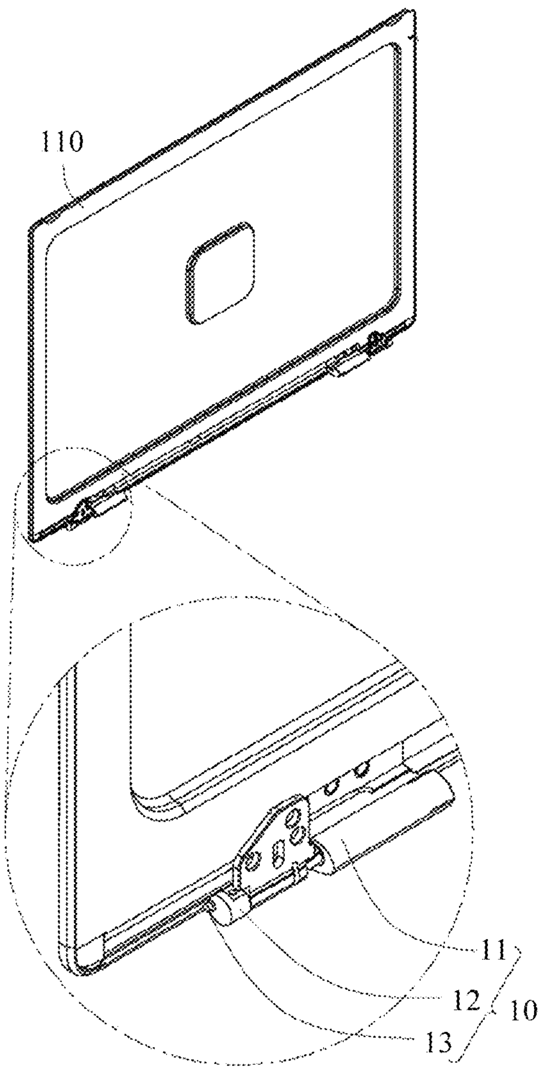
FIG. 2 is a schematic diagram of a three-dimensional structure of a top plate shown in FIG. 1 and a locally enlarged view of the top plate.

Refer to FIG. 2. At least a rotating shaft structure 10 is disposed on one side of the top plate 110, and the top plate 110 is rotatably connected to the keyboard substrate 130 by using the rotating shaft structure 10. In an embodiment, the rotating shaft structure 10 includes one shaft sleeve 11 fastened onto the top plate, a rotating shaft 12 that passes through the shaft sleeve 11 and that is fastened onto the shaft sleeve 11, and a eccentric protrusion 13 formed at one end of the rotating shaft 12. The top plate 110 is slidably connected to the keyboard substrate 130 by using the eccentric protrusion 13, and the top plate 110 is rotatably connected to the bottom plate 140 by using the rotating shaft 12. Because a center of the eccentric protrusion 13 and a center of the rotating shaft 12 are not on a same straight line, when the top plate 110 rotates relative to the bottom plate 140, the top plate 110 is capable of sliding in an arc slot 311 (referring to the following descriptions) of the keyboard substrate 130, so as to drive the keyboard substrate 130 to slide.

In an embodiment, there are two rotating shaft structures 10, and the two rotating shaft structures 10 are formed on a same side of the top plate 110 and on a same straight line. Certainly, in another implementation, a quantity of rotating shaft structures 10 is not limited to two, and may be determined based on an actual situation.

Figure 3:
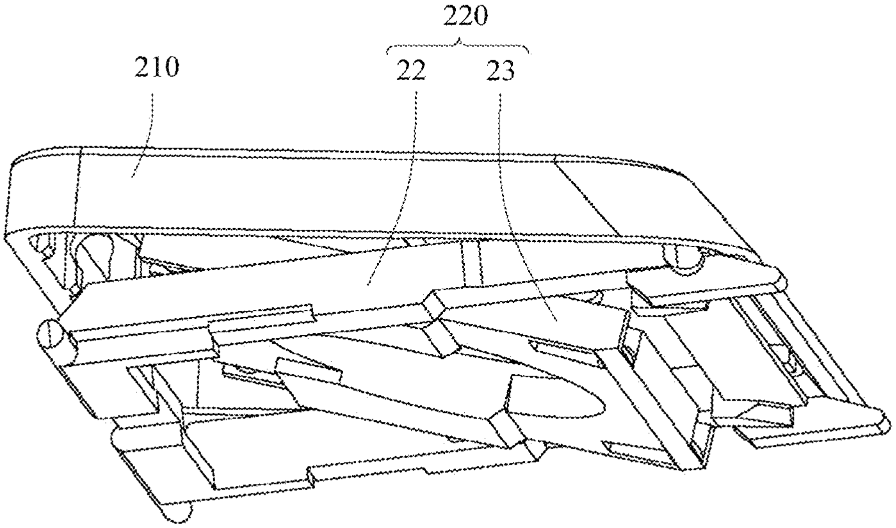
FIG. 3 is a schematic diagram of a three-dimensional structure of a keycap and a lifting support shown in FIG. 1.

Refer to FIG. 3. The lifting support 220 includes a first mount 22 and a second mount 23 connected to the first mount 22. In an embodiment, the lifting support 220 has an X shape. One end of the first mount 22 is connected to the keyboard substrate 130, and the other end abuts against the keycap 210 and is capable of sliding on the keycap 210. One end of the second mount 23 is connected to the keycap 210, and the other end abuts against the keyboard substrate 130 and is capable of sliding on the keyboard substrate 130. Preferably, the first mount 22 and the second mount 23 are connected in a hinged manner. Certainly, the first mount 22 and the second mount 23 may be connected in another manner, which is not limited to the hinged manner.

Figure 4:
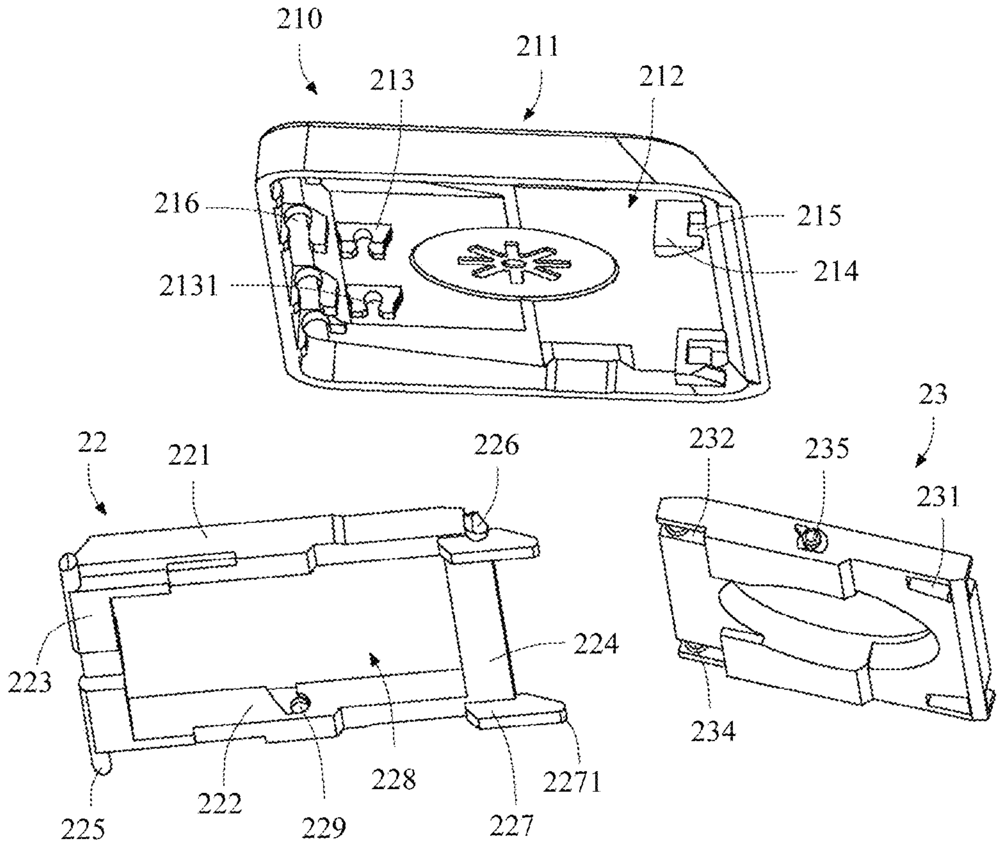
FIG. 4 is an exploded diagram of the keycap and lifting support shown in FIG. 3.
Figure 5:
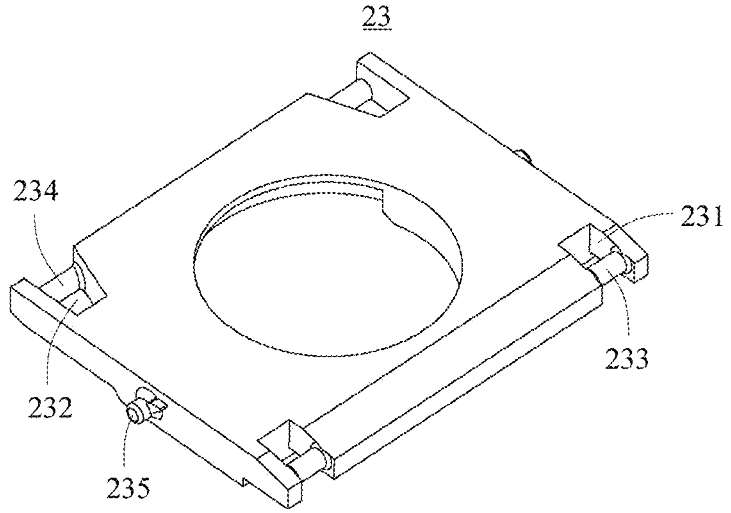
FIG. 5 is a schematic three-dimensional diagram of a first mount of a key shown in FIG. 4 from another perspective.

Refer to FIG. 4. Each keycap 210 includes a first surface 211 and a second surface 212 opposite to the first surface 211. Two fastening blocks 213, two limiting grooves 214, two third clamping members 215, and at least one first accommodation groove 216 are further formed on the second surface 212 of the keycap 210. The first accommodation groove 216 and the limiting groove 214 are respectively located at two opposite ends of the second surface 212 of the keycap 210. The fastening block 213 is located between the first accommodation groove 216 and the limiting groove 214 and is disposed close to the first accommodation groove 216. A second clamping slit 2131 is formed on each fastening block 213. The two third clamping members 215 each are located and fastened in the limiting groove 214.

Refer to FIG. 4. The first mount 22 includes a first side wall 221, a second side wall 222, a third side wall 223, and a fourth side wall 224 that are connected head-to-tail. The first side wall 221, the second side wall 222, the third side wall 223, and the fourth side wall 224 enclose a first accommodation chamber 228. The second mount 23 is accommodated in the first accommodation chamber 228. In an embodiment, the first side wall 221 is disposed opposite to the second side wall 222, and the third side wall 223 is disposed opposite to the fourth side wall 224. In an embodiment, the first side wall 221, the second side wall 222, the third side wall 223, and the fourth side wall 224 are integrally formed.

A first clamping shaft 225 is fastened onto one side face of the third side wall 223, and the first clamping shaft 225 protrudes from the third side wall 223. Two ends of the first clamping shaft 225 are respectively connected to the first clamping member 331 (referring to the following descriptions) of the keyboard substrate 130. Preferably, the first clamping shaft 225 and the first clamping member 331 are connected in a hinged manner. Certainly, the first mount 22 and the first clamping member 331 may be connected in another manner, which is not limited to the hinged manner.

Two side plates 227 and a first connecting shaft 226 extending from surfaces of the two side plates 227 are disposed on two ends of the fourth side wall 224. The two side plates 227 are approximately disposed perpendicular to the fourth side wall 224, and each side plate 227 is approximately wedge-shaped and has a protruding corner 2271. Two ends of the first connecting shaft 226 protrude from the fourth side wall 224 and are fastened onto two protruding corners 2271. The two ends of the first connecting shaft 226 pass through the limiting groove 214 and are connected to the third clamping member 215 of the keycap 210. When the keycap 210 ascends, the first connecting shaft 226 slides in a first direction in the limiting groove 214 and is detached from the third clamping member 215.

A pin shaft hole 229 is formed in each of the first side wall 221 and the second side wall 222, and two pin holes 229 have opposite locations.

Figure 6:
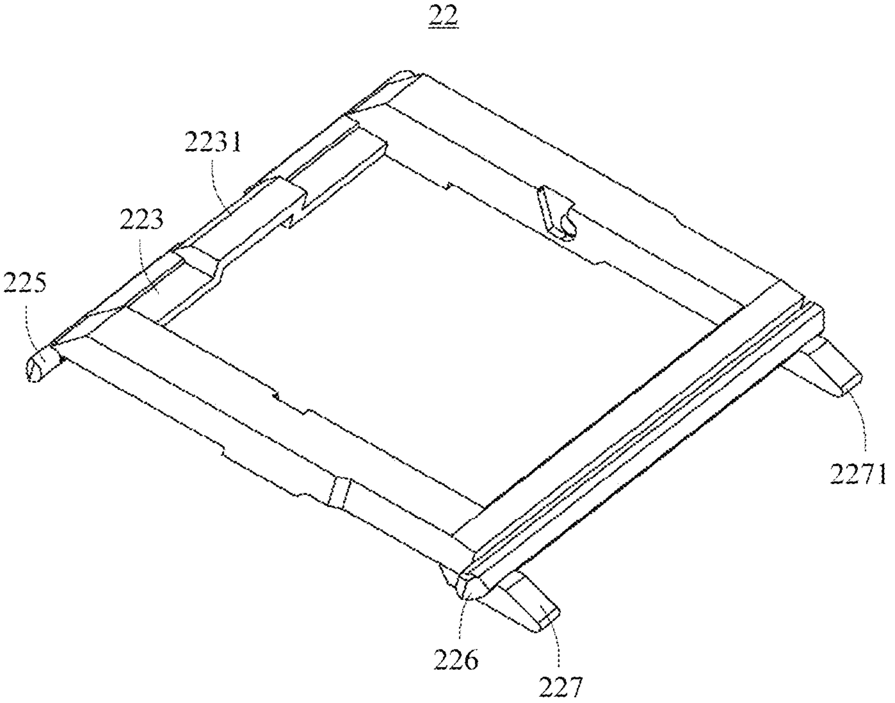
FIG. 6 is a schematic three-dimensional diagram of a second mount of a key shown in FIG. 4 from another perspective.

Refer to FIG. 6. A protruding block 2231 is further formed on the third side wall 223, and the protruding block 2231 is accommodated in the first accommodation groove 216. When the keycap 210 ascends, the protruding block 2231 is detached from the first accommodation groove 216.

Refer to FIG. 4 and FIG. 6. Two second accommodation grooves 231 and two third accommodation grooves 232 are disposed on the second mount 23. The two second accommodation grooves 231 and the two third accommodation grooves 232 are respectively located at two ends of the second mount 23.

Two second clamping shafts 233 and two third clamping shafts 234 are further disposed on the second mount 23. The two second clamping shafts 233 are respectively accommodated and fastened in the two second accommodation grooves 231, and each are slidably connected to the second clamping member 332 (referring to the following descriptions) of the keyboard substrate 130. When one end of the second mount 23 slides to the second clamping member 332, the two second clamping shafts 233 are connected to the second clamping member. The two third clamping shafts 234 are respectively accommodated and fastened in the two third accommodation grooves 232, and the third clamping shaft 234 is accommodated in the second clamping slit 2131 and is connected to the fastening block 213. When the keycap 210 ascends, the second clamping shaft 233 is detached from the second clamping member 332.

Two pin shafts 235 are further disposed on the second mount 23, and two pin shafts 235 are respectively located on two opposite sides of the second mount 23 and have opposite locations. The two pin shafts 235 respectively match the two pin shaft holes 229, to connect the second mount 23 and the first mount 22.

Figure 7:
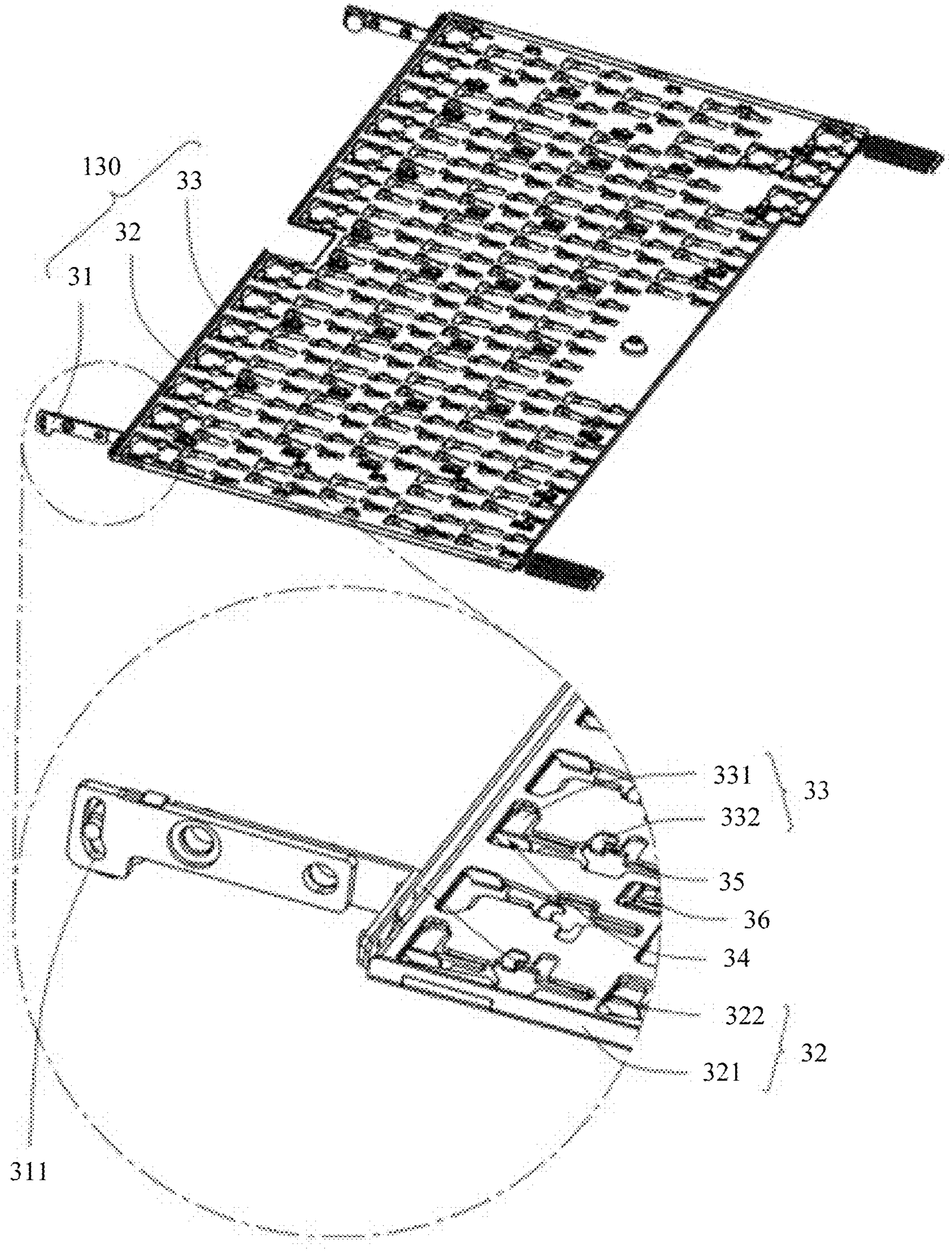
FIG. 7 is a schematic diagram of a three-dimensional structure of a keyboard substrate shown in FIG. 1 and a locally enlarged view of the keyboard substrate.
Figure 8:
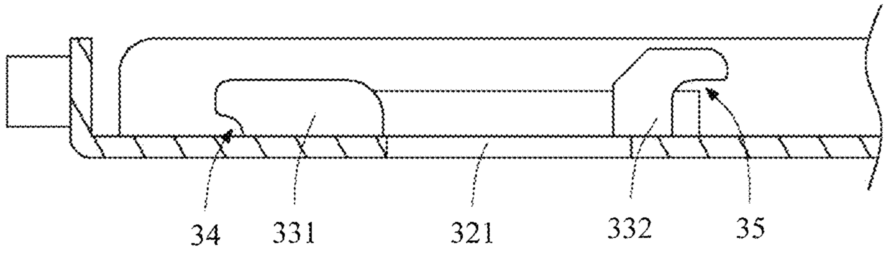
FIG. 8 is a partial cutaway drawing of a first clamping member and a second clamping member in the keyboard substrate shown in FIG. 7.

Refer to FIG. 7 and FIG. 8. The keyboard substrate 130 includes a main body portion 32 and two connecting arms 31 fastened onto the main body portion 32, and one end of the lifting support 220 is connected to the main body portion 32. In an embodiment, one end that is of each connecting arm 31 and that is away from the main body portion 32 is provided with one arc slot 311, and the arc slot 311 passes through the connecting arm 31. In an embodiment, a center of the arc slot 311 is located between the arc slot 311 and the main body portion 32. The arc slot 311 is sleeved on the eccentric protrusion 13. When the top plate 110 is folded or unfolded, the eccentric protrusion 13 is capable of sliding in the arc slot 311, to drive the keyboard substrate 130 to slide.

The keyboard substrate 130 further includes a plurality of clamping assemblies 33. The plurality of clamping assemblies 33 are fastened onto the main body portion 32.

A distance of the connecting arm 31 to the main body portion 32 may be adjusted based on an actual situation.

In an embodiment, the main body portion 32 includes a keyboard substrate body 321 and a protruding edge 322 extending from an edge of the keyboard substrate body 321. The connecting arm 31 is fastened onto the protruding edge 322. The plurality of the clamping assemblies 33 are formed on the keyboard substrate body 321.

In an embodiment, each clamping assembly 33 includes two first clamping members 331 and two second clamping members 332. The two first clamping members 331 have opposite locations, the two second clamping members 332 have opposite locations, and a first clamping member 331 and a second clamping member 332 have opposite locations.

In an embodiment, the first clamping member 331 and the second clamping member 332 each are a clamping hook. A hook of the first clamping member 331 and a hook of the second clamping member 332 are disposed in opposite directions.

A first ani-interference cut 34 is formed between each first clamping member 331 and the keyboard substrate body 321, and a second ani-interference cut 35 is formed between each second clamping member 332 and the keyboard substrate body 321. The first ani-interference cut 34 is configured to accommodate two ends of the first clamping shaft 225. The second ani-interference cut 35 is configured to accommodate the second clamping shaft 233.

Figure 9:
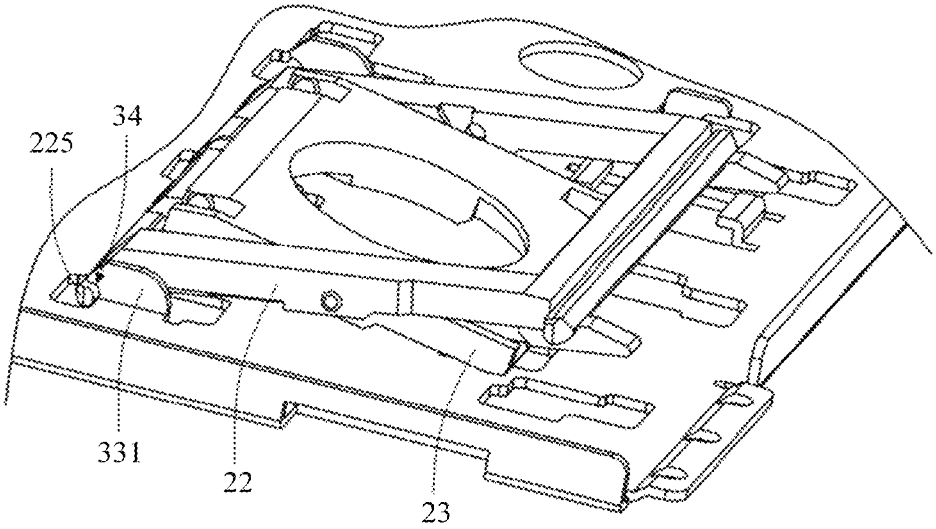
FIG. 9 is a schematic diagram of a connection between the first mount shown in FIG. 5 and the first clamping member shown in FIG. 8.

Refer to FIG. 9. The two ends of the first clamping shaft 225 are accommodated in two first ani-interference cuts 34, and are connected to the two first clamping members 331. Preferably, the first clamping shaft 225 and the first clamping member 331 are connected in a hinged manner. Certainly, the first mount 22 and the first clamping member 331 may be connected in another manner, which is not limited to the hinged manner.

Figure 10:
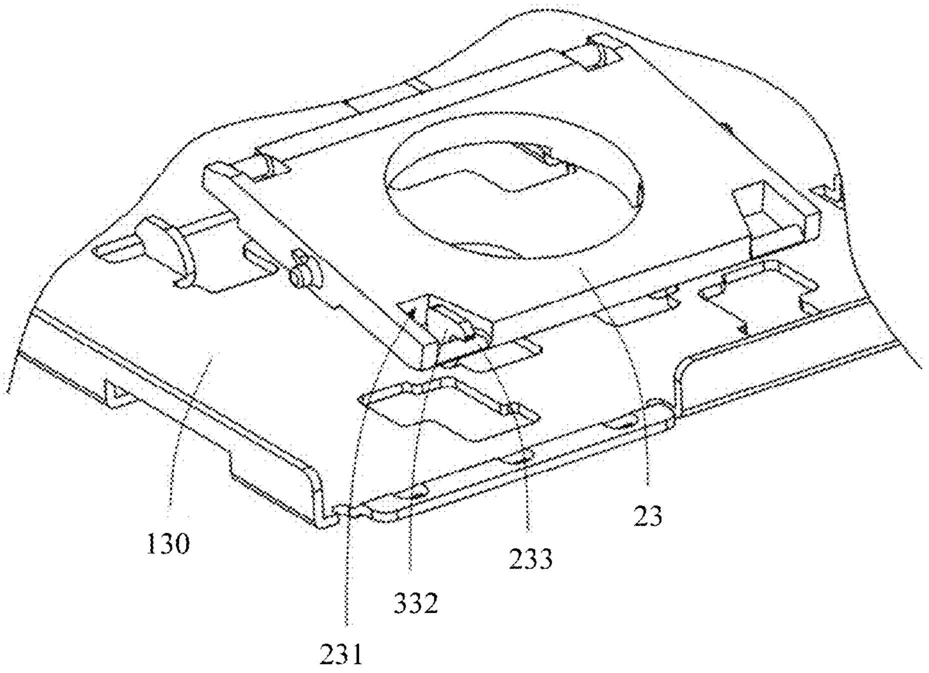
FIG. 10 is a schematic diagram of a connection between the second mount shown in FIG. 6 and the second clamping member shown in FIG. 8.

Refer to FIG. 10. The second clamping member 332 passes through the second accommodation groove 231. The second clamping shaft 233 is accommodated in the second ani-interference cut 35, and is slidably connected to the second clamping member 332. When the keycap 210 ascends, the second clamping member 332 is detached from the second clamping shaft 233, and is capable of sliding in the second accommodation groove 231.

Refer to FIG. 11 to FIG. 14. A plurality of first limiting holes 36 are further formed in the keyboard substrate body

321. In an embodiment, the first limiting hole 36 is a rectangular hole. An extension direction of a long side of the first limiting hole 36 is the same as a movement direction of the keyboard substrate 130. One folding side 361 is disposed on each of two short sides of the first limiting hole 36. A pad 37 is disposed on two folding sides 361. The pad 37 is provided with a second limiting hole 371, and an extension direction of a long side of the second limiting hole 371 is the same as an extension direction of a long side of the first limiting hole 36. Locations of the second limiting hole 371 and the first limiting hole 36 are opposite to a solid portion of the bottom plate 140 between two adjacent key accommodation grooves 41 (referring to the following descriptions) of the bottom plate 140. In an embodiment, the second limiting hole 371 is an oblong hole. A step-like limiting member 38 sequentially passes through the first limiting hole 36 and the second limiting hole 371, and is fastened onto the bottom plate 140.

Figure 14:
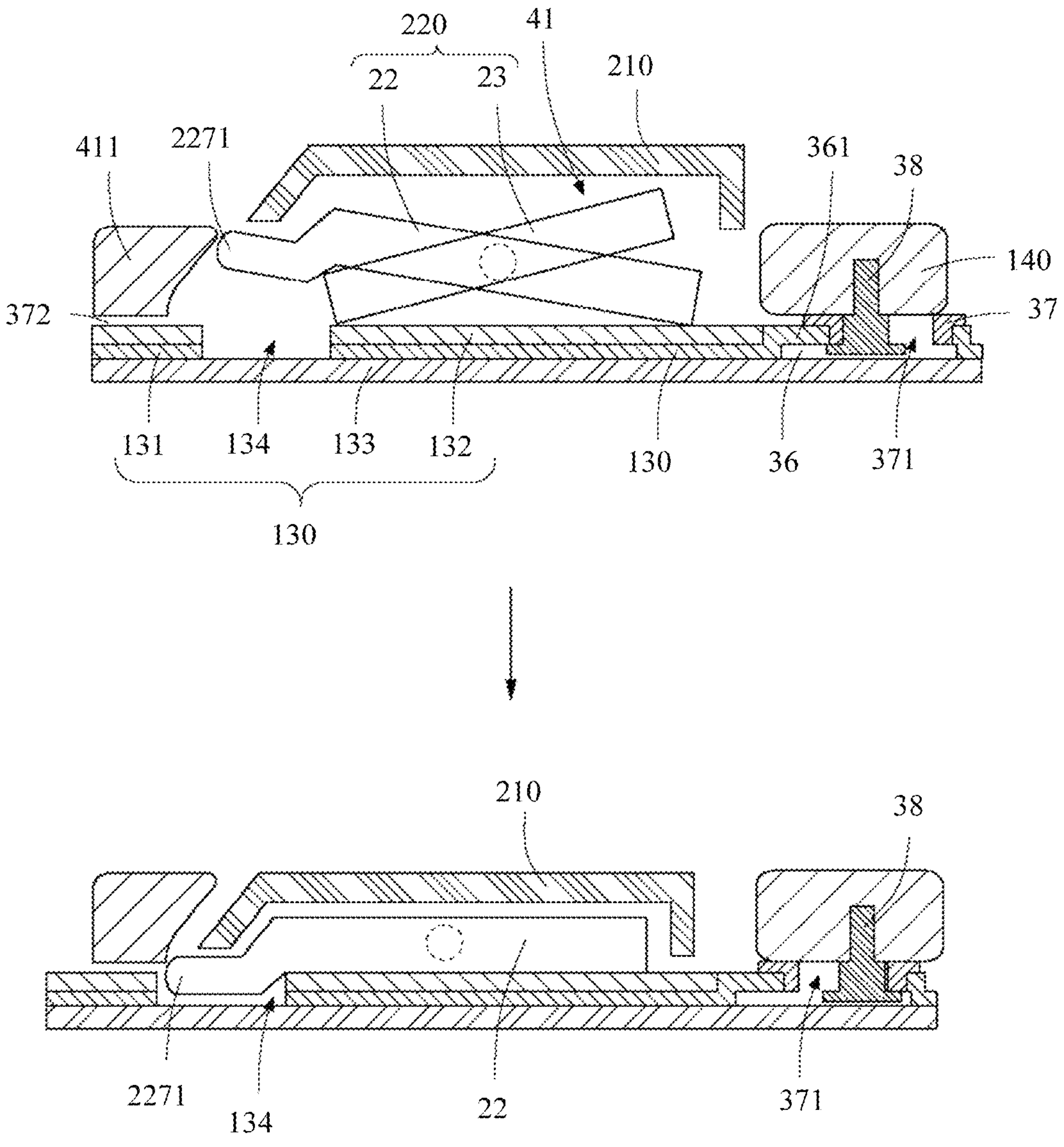
FIG. 14 is a schematic diagram of a descending process of a keycap, where the figure shows a movement track of a limiting member in a second limiting hole in the descending process of the keycap.

Refer to FIG. 14. Because the pad 37 is disposed between the keyboard substrate 130 and the bottom plate 140, there is a gap 372 between the keyboard substrate 130 and the bottom plate 140. The keyboard substrate 130 further includes a metal plate 131, a thin film circuit layer 132 formed on the metal plate 131, and a backlight film layer 133. The thin film circuit layer 132 and the backlight film layer 133 are formed on two opposite surfaces of the metal plate 131. The first limiting hole 36 is formed on the metal plate 131, and the folding side 361 is a part of the metal plate 131. A third ani-interference cut 134 is also formed at a location that is on the keyboard substrate 130 and that corresponds to the lifting support 220. When the protruding corner 2271 of the first mount 22 of the lifting support 220 slides to a bottom end of a concave slope 411 (referring to the following descriptions) of the bottom plate 140, the gap 372 matches the third ani-interference cut 134, to accommodate the side plate 227 of the first mount 22 in the third ani-interference cut 134.

In this embodiment, the limiting member 38 is a step screw. The limiting member 38 includes a limiting portion 381 and a fastening portion 382, and the fastening portion 382 is vertically fastened onto the limiting portion 381. The limiting portion 381 is presented in a boss shape. A cross-sectional dimension of the limiting portion 381 is greater than a cross-sectional dimension of the fastening portion 382. The cross-sectional dimension of the limiting portion 381 is greater than a cross-sectional dimension of a short side of the second limiting hole 371 of the pad 37, to prevent the pad 37 from falling off and impose a limitation in a short side direction of the second limiting hole 371. The cross-sectional dimension of the fastening portion 382 is less than the cross-sectional dimension of the short side of the second limiting hole 371, so that when the keyboard substrate 130 is pulled, the limiting member 38 is capable of sliding in the second limiting hole 371 in a long side direction of the second limiting hole 371. The limiting portion 381 of the limiting member 38 matches the bottom plate 140, to fasten the keyboard substrate 130 and the pad 37 together, so as to limit the pad 37 and the keyboard substrate 130, and ensure movement precision of the keyboard substrate 130.

In an embodiment, a material of the pad 37 is a material with a low friction coefficient, to ensure smoothness of relative movement between the keyboard substrate 130 and the bottom plate 140. In an embodiment, the material of the pad 37 is polyformaldehyde (POM), polyethylene (PE), polyethylene terephthalate (PET), or the like.

Figure 11:
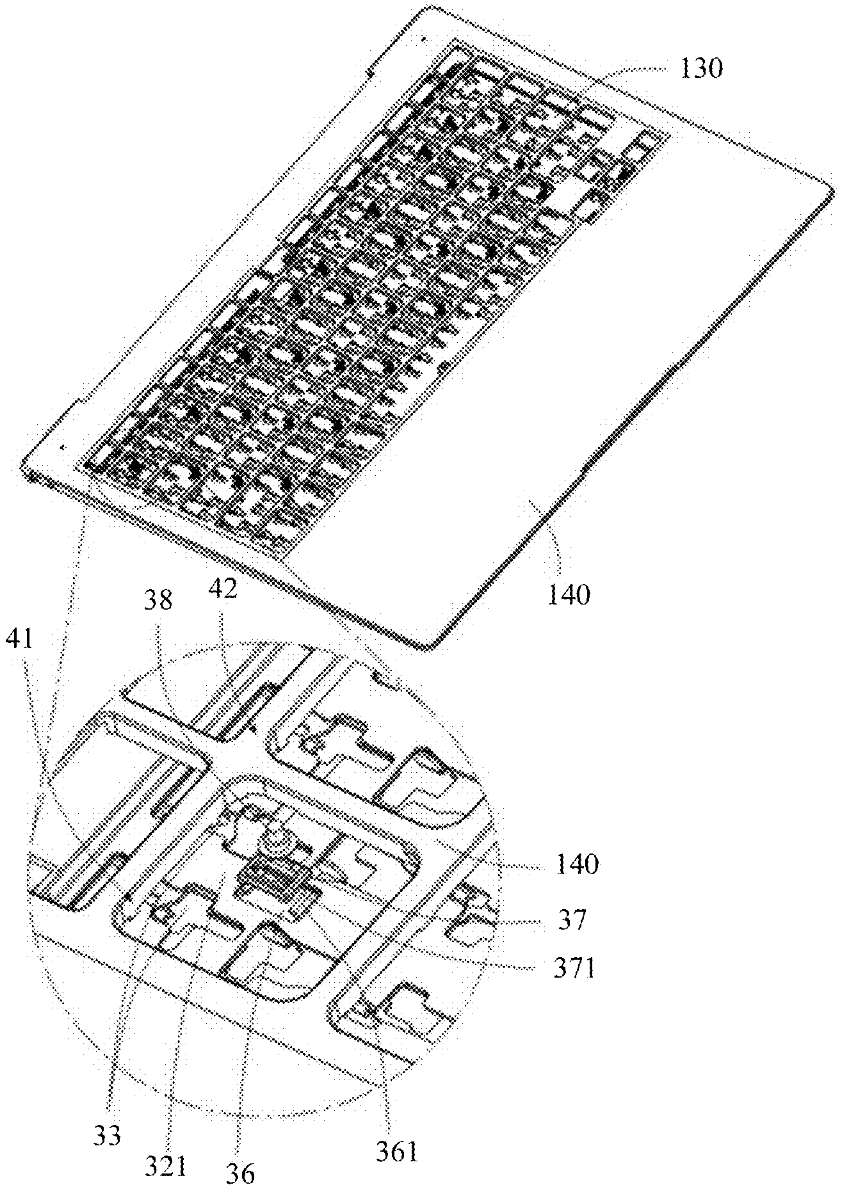
FIG. 11 is a schematic three-dimensional diagram of a bottom plate (with a keyboard substrate) shown in FIG. 1 and a locally enlarged view of the bottom plate (with the keyboard substrate)
Figure 12:
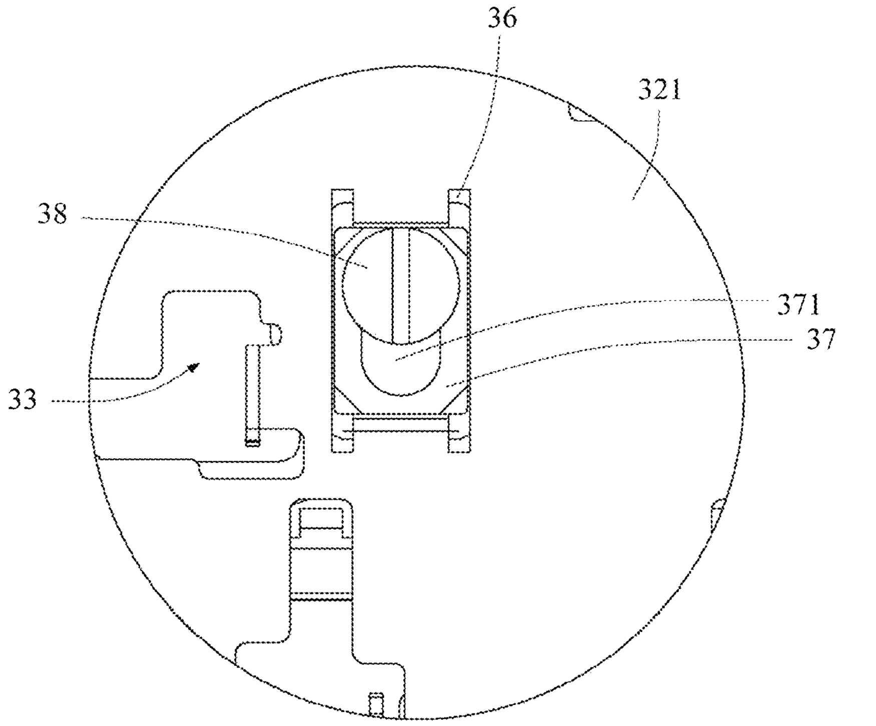
FIG. 12 is a bottom view of a limiting structure shown in FIG. 11.
Figure 13:
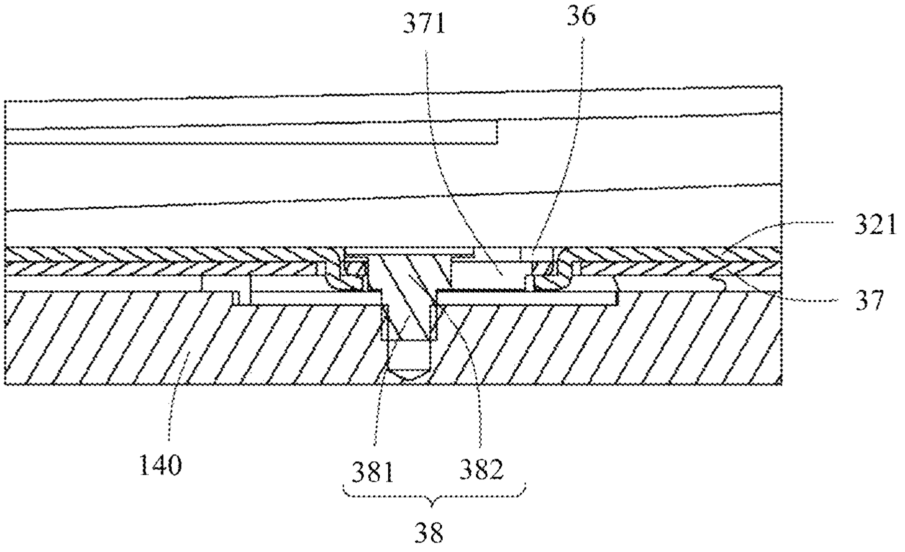
FIG. 13 is a cutaway drawing of the limiting structure shown in FIG. 12.

Refer to FIG. 11 and FIG. 14. The bottom plate 140 includes a plurality of key accommodation grooves 41 one-to-one corresponding to the plurality of keycaps 210, and an inner wall of each key accommodation groove 41 has at least one concave slope 411 (referring to FIG. 14). The concave slope 411 is inclined toward the protruding corner 2271. The lifting support 220 is accommodated in the plurality of the key accommodation grooves 41, and the protruding corner 2271 abuts against the concave slope 411. The protruding corner 2271 abuts against the concave slope 411 and is capable of sliding on the concave slope 411.

In a process in which the top plate 110 rotates to a first specified location relative to the bottom plate 140, the top plate 110 drives the keyboard substrate 130 to move relative to the bottom plate 140, so that a protruding corner 2271 of each lifting support 220 slides in a first direction on the concave slope 411, and each lifting support 220 descends, to drive each keycap 210 to descend. In a process in which the top plate 110 rotates to a second specified location relative to the bottom plate 140, the top plate 110 drives the keyboard substrate 130 to move relative to the bottom plate 140, so that the protruding corner 2271 of each lifting support 220 slides in a second direction on the concave slope 411, and each lifting support 220 ascends, to drive each keycap 210 to ascend. A direction in which the top plate 110 rotates to the first specified location is opposite to a direction in which the top plate 110 rotates to the second specified location.

An unfolding angle of the top plate 110 is 0 degrees to 90 degrees.

Figure 15:
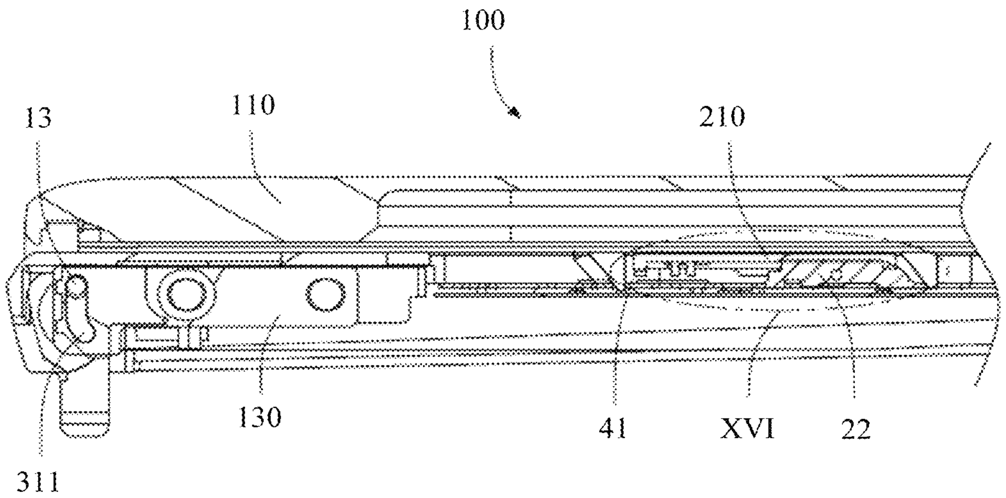
FIG. 15 is a cutaway drawing and a locally enlarged view of the device framework shown in FIG. 1 in a closed state (a top plate is at a first specified location), where some elements are hidden.
Figure 16:
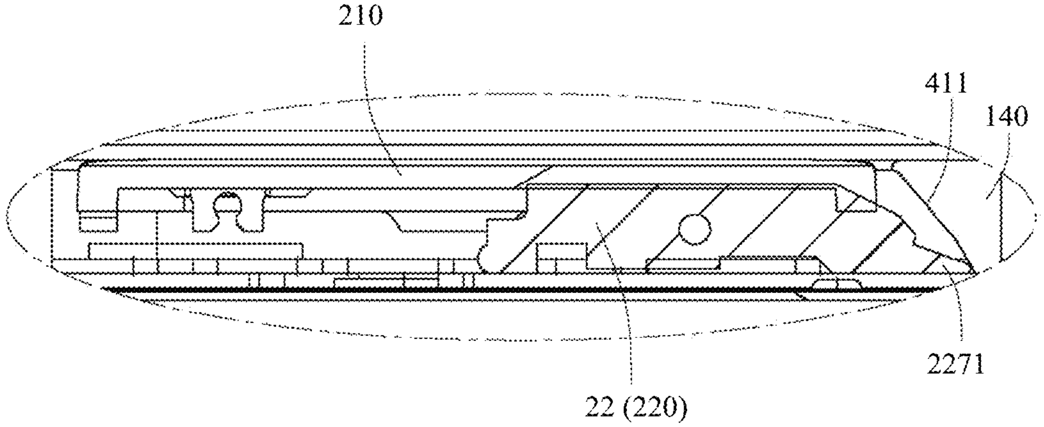
FIG. 16 is an enlarged view of XVI shown in FIG. 15.

Refer to FIG. 14 to FIG. 16. When the top plate 110 is at the first specified location (the top plate 110 is closed), the keyboard substrate 130 and the lifting support 220 are in a locking location, and the top plate 110 and the concave slope 411 provide downward pressure for the keycap 210, to lock the keycap 210 at a location at which the keycap 210 is pressed. In this case, the keycap array 120 descends to a lowest location, and the keycap 210 is at least lower than or flush with the keyboard surface 42 (referring to the following descriptions) of the bottom plate.

In an embodiment, when the top plate 110 is closed (the top plate 110 is at the first specified location), the top plate 110 drives the lifting support 220 to get close to the concave slope 411. When the top plate 110 and the concave slope 411 match each other, the protruding corner 2271 slides from a top end (a point at which the concave slope 411 and the keyboard surface 42 intersect) of the concave slope 411 to a bottom of the concave slope 411, the lifting support 220 descends, and the keycap 210 descends with the lifting support 220. In this process, a force exerted on the protruding corner 2271 from the concave slope 411 gradually increases. When the protruding corner 2271 slides to a bottom of the concave slope 411 along the concave slope 411, the keycap array 120 descends to a lowest location.

In an embodiment, the eccentric protrusion 13 of the rotating shaft 12 of the top plate 110 slides, to an end close to the top plate 110, from an end that is of the arc slot 311 and that is away from the top plate 110, to drive the keyboard substrate 130 to move (the bottom plate 140 remains stationary), and the limiting member 38 reversely moves in the second limiting hole 371 and the first limiting hole 36 relative to the keyboard substrate 130. In an embodiment, the first clamping member 331 of the keyboard substrate 130 drives the first clamping shaft 225 of the first mount 22 to move in the first direction, the first connecting shaft 226 of the first mount 22 moves toward the third clamping member 215 in the limiting groove 214, and the first connecting shaft 226 of the first mount 22 is connected to the third clamping member 215 when the top plate 110 is completely closed. In addition, the protruding corner 2271 of the first mount 22 slides to the bottom of the concave slope 411 along the concave slope 411 of the key accommodation groove 41 of the bottom plate 140. In addition, the second clamping shaft 233 of the second mount 23 moves away from the second clamping member 332 of the keyboard substrate 130 and is detached from the second clamping member 332. When the top plate 110 is completely closed, the keycap 210 is lower than or flush with the keyboard surface 42 of the bottom plate 140, and the protruding corner 2271 abuts against the bottom of the concave slope 411.

The keycap 210 is lower than or flush with the keyboard surface 42 of the bottom plate 140, to avoid a case in which the keycap 210 interferes with the screen and the screen is damaged.

Figure 17:
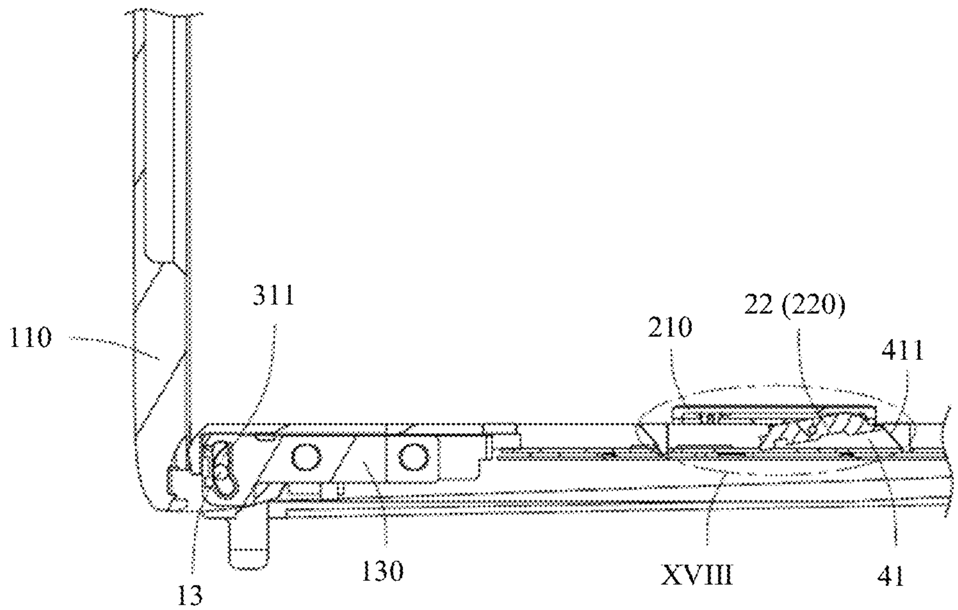
FIG. 17 is a cutaway drawing of the device framework shown in FIG. 1 in an unfolded state (a top plate is at a second specified location), where some elements are hidden.
Figure 18:
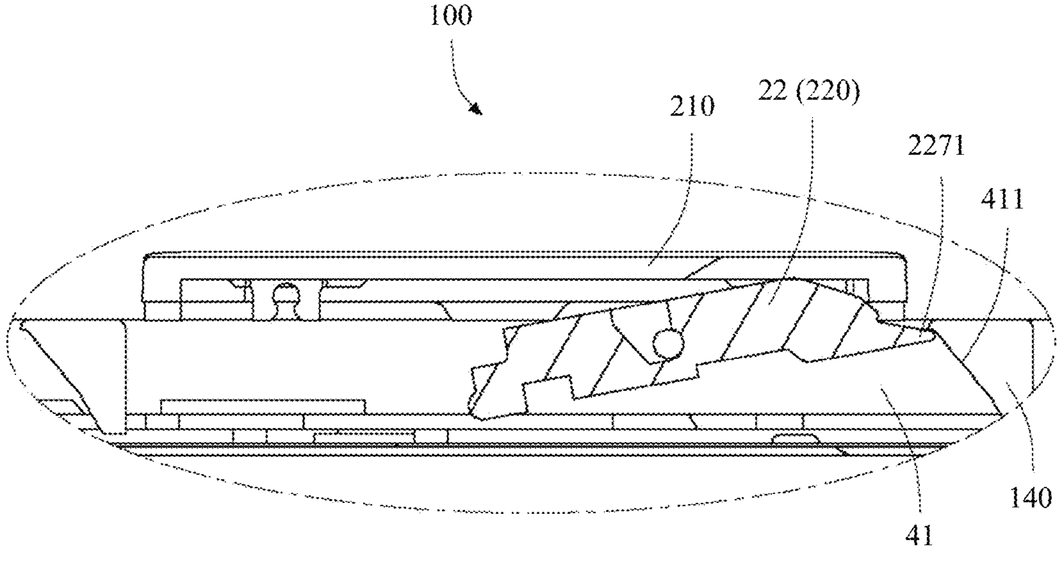
FIG. 18 is an enlarged view of XVIII shown in FIG. 17.

Refer to FIG. 17 and FIG. 18. When the top plate 110 is at the second specified location (the top plate 110 is unfolded by 90 degrees relative to the keyboard substrate 130), the keyboard substrate 130 and the lifting support 220 are at a first driving location, and the top plate 110, the keyboard substrate 130, and the lifting support 220 provide an upward supporting force for the keycap 210. In this case, the keycap array 120 ascends to a highest location, and correspondingly, the keycap 220 obtains a maximum key travel distance.

In an embodiment, when the top plate 110 is at the second specified location, the top plate 110 drives the protruding corner 2271 of the lifting support 220 to get away from the concave slope 411, and the top plate 110 and the concave slope 411 match each other, the protruding corner 2271 slides from the bottom of the concave slope 411 to a top end of the concave slope 411, the lifting support 220 ascends, and the keycap 210 ascends with the lifting support 220. The force exerted on the protruding corner 2271 from the concave slope 411 gradually decreases. When the protruding corner 2271 ascends to the top end of the concave slope 411 along the concave slope 411, the key 120 ascends to the highest location.

In an embodiment, the eccentric protrusion 13 of the rotating shaft 12 of the top plate 110 slides, to an end away from the top plate 110, from an end that is of the arc slot 311 and that is close to the top plate 110, to drive the keyboard substrate 130 to move, and the limiting member 38 reversely moves in the second limiting hole 371 and the first limiting hole 36 relative to the keyboard substrate 130. In an embodiment, the first clamping member 331 of the keyboard substrate 130 drives the first clamping shaft 225 of the first mount 22 to move. In addition, the first connecting shaft 226 of the first mount 22 moves in the limiting groove 214 in a direction away from the third clamping member 215 and is detached from the third clamping member 215. In addition, the protruding corner 2271 of the first mount 22 slides upwards along the concave slope 411. In addition, the keyboard substrate 130 drives the second clamping member 332 to move toward the second clamping shaft 233 of the second mount 23 and is connected to the second clamping member 332. When the top plate 110 is completely unfolded, the keycap 210 is higher than the keyboard surface 42 of the bottom plate 140 and ascends to a highest location, and the protruding corner 2271 slides upwards to the top end of the concave slope 411.

Figure 19:
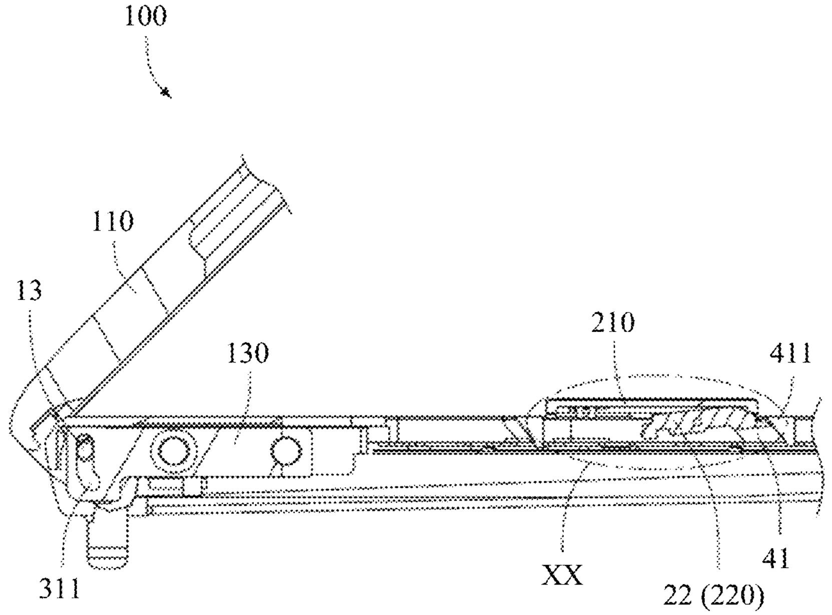
FIG. 19 is a cutaway drawing of a keyboard assembly shown in FIG. 1 in a half-unfolded state (a top plate is at a third specified location), where some elements are hidden.
Figure 20:
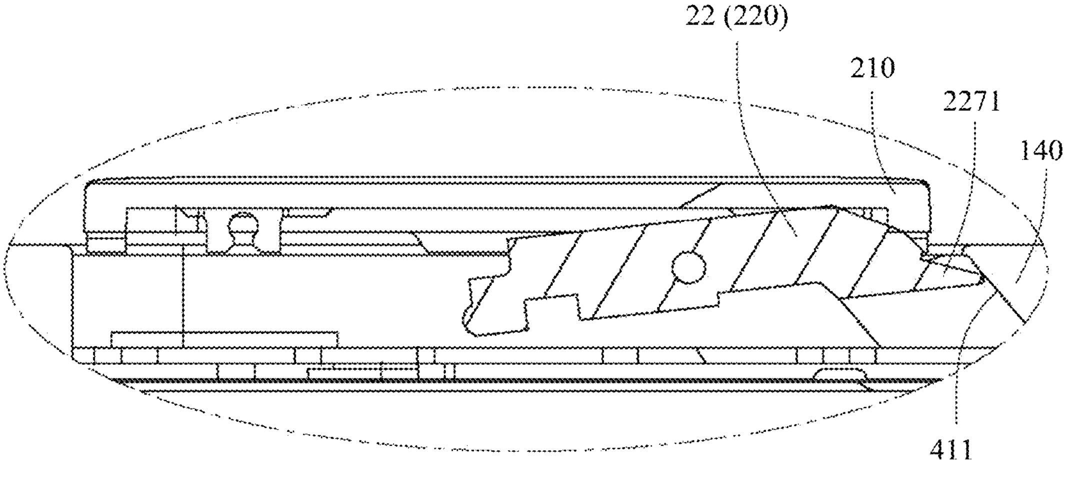
FIG. 20 is an enlarged view of XX shown in FIG. 19.

Refer to FIG. 19 and FIG. 20. When the top plate 110 is at a third specified location (the top plate 110 is unfolded by 45 degrees relative to the keyboard substrate 130), the keyboard substrate 130 and the lifting support 220 are at a second driving location, and provide an upward supporting force for the keycap 210. In this case, the key 120 ascends to a location that is half of the highest location.

The bottom plate 140 further includes a keyboard surface 42 facing the top plate 110 (when the top plate 110 is at the first specified location). When the key 120 descends to a lowest location, the keycap 210 is lower than or flush with the keyboard surface 42.

According to the keyboard assembly, the device framework, and the electronic device including the device framework provided in this application, (1) the top plate 110 rotates to drive the keyboard substrate 130 to perform translation, and the protruding corner 2271 of the lifting support 220 and the concave slope 411 of the key accommodation groove 41 of the bottom plate 140 press each other to generate a relative displacement, so that the lifting support 220 is longitudinally stretched or retracted, to drive the keycap 210 to ascend or descend, thereby obtaining a keyboard assembly having a stable movement of a structure, a thin shape, and a long key travel distance; (2) all keycaps 210 can simultaneously ascend or descend by using only a group of simple mechanisms (the top plate 110, the keyboard substrate 130, and the concave slope 411), to simplify an overall structure of the keyboard assembly or the device framework 100, and reduce an overall weight and manufacturing costs of the keyboard assembly and the device framework 100; (3) when the top plate 110 is at the first specified location (the top plate 110 is completely closed), the keycap 210 is lower than or flush with the keyboard surface 42 of the bottom plate 140, so that a keyboard assembly has a flat keyboard appearance surface, to improve a feeling of the user, and increase a product difference; (4) a pad with a low friction coefficient matches the step-like limiting member 38, to limit the keyboard substrate 130, so that not only movement precision of the keyboard substrate 130 relative to the bottom plate can be ensured, but also smoothness of a relative movement between the keyboard substrate 130 and the bottom plate 140 can be ensured, to improve user experience; and (5) the limiting member 38 (step screw) is used as a limiting structure, to improve movement precision of the keyboard assembly.

The foregoing descriptions are merely preferred implementations of this application, and do not impose a limitation on any form of this application. Although the preferred implementations of this application are disclosed above, and are not intended to limit this application and equivalent implementations obtained after any person skilled in the art makes some changes, modifications, or equivalent changes to the technical content disclosed above without departing from a range of the technical solutions of this application. Any simple modification, and equivalent change and modification made to the foregoing implementations based on the technical substance of this application without departing from content of the technical solutions of this application shall still fall within the range of the technical solutions of this application.

What is claimed is:

1. A keyboard assembly, comprising:
- a keyboard substrate;
- a keycap array comprising a plurality of keycaps; and
- a lifting support array comprising a plurality of lifting supports that are one-to-one corresponding to the plurality of keycaps;
- wherein, for each keycap of the plurality of keycaps, a keycap is connected to the keyboard substrate by using a lifting support of the plurality of lifting supports corresponding to the keycap;
- wherein the keyboard substrate is configured to be connected to a bottom plate and a top plate;

wherein the top plate is rotatably connected to the bottom plate;

wherein the bottom plate comprises a plurality of key accommodation grooves that are one-to-one corresponding to the plurality of keycaps;

wherein, for each key accommodation groove of the plurality of key accommodation grooves, a key accommodation groove comprises a concave slope;

wherein the lifting support is located in the key accommodation groove;

wherein one end of the lifting support abuts against the concave slope and is capable of sliding on the concave slope;

wherein in a process in which the top plate rotates to a first location relative to the bottom plate, the top plate drives the keyboard substrate to move relative to the bottom plate, so that each lifting support slides in a first direction on the concave slope, and each lifting support descends, to drive each keycap to descend;

wherein in a process in which the top plate rotates to a second location relative to the bottom plate, the top plate drives the keyboard substrate to move relative to the bottom plate, so that each lifting support slides in a second direction on the concave slope, and each lifting support ascends, to drive each keycap to ascend, thereby increasing a key travel distance of the keycap; and wherein a direction in which the top plate rotates to the first location is opposite to a direction in which the top plate rotates to the second location.

2. The keyboard assembly according to claim 1, wherein when the top plate rotates relative to the bottom plate, the bottom plate remains stationary, and the top plate drives the keyboard substrate to move relative to the bottom plate.

3. The keyboard assembly according to claim 2, wherein a rotating shaft structure is disposed on one side of the top plate, and the top plate is connected to each of the bottom plate and the keyboard substrate by using the rotating shaft structure.

4. The keyboard assembly according to claim 1, wherein the keyboard substrate further comprises a plurality of clamping assemblies, wherein each clamping assembly comprises two first clamping members and two second clamping members, wherein the lifting support comprises a first mount and a second mount connected to the first mount, wherein a first end of the first mount is connected to the first clamping member, wherein a first end of the second mount abuts against the keyboard substrate and is capable of sliding on the keyboard substrate, and can be connected to the second clamping member when the end slides to the second clamping member, wherein a second end of the first mount abuts against the keycap and is capable of sliding on the keycap, and wherein a second end of the second mount is connected to the keycap.

5. The keyboard assembly according to claim 4, wherein two side plates are disposed on the first mount;

wherein each side plate is wedge-shaped and comprises a protruding corner that abuts against and matches the concave slope;

wherein in the process in which the top plate rotates to the first location relative to the bottom plate, the top plate drives the keyboard substrate to move relative to the bottom plate, so that each protruding corner slides in the first direction on the concave slope; and wherein in the process in which the top plate rotates to the second location relative to the bottom plate, the top plate drives the keyboard substrate to move relative to the bottom plate, so that each protruding corner slides in the second direction on the concave slope.

6. The keyboard assembly according to claim 5, wherein the bottom plate further comprises a keyboard surface, and when the top plate is at the first location, the keycap is accommodated in the key accommodation groove and is at least lower than or flush with the keyboard surface of the bottom plate.

7. The keyboard assembly according to claim 4, wherein the keycap comprises at least one fastening block and two third clamping members, a first connecting shaft is further disposed on the first mount, two ends of the first connecting shaft are separately slidably connected to the third clamping member, two third clamping shafts are further disposed on the second mount, and the third clamping shaft is connected to the fastening block.

8. The keyboard assembly according to claim 4, wherein a first clamping shaft is disposed on the first mount, two second clamping shafts are further disposed on the second mount, two ends of the first clamping shaft are connected to the two first clamping members, and the second clamping shaft is slidably connected to a second clamping member of the two second clamping members.

9. The keyboard assembly according to claim 1, wherein a plurality of first limiting holes are further formed on the keyboard substrate, an extension direction of a long side of a first limiting hole of the plurality of first limiting holes is same as a movement direction of the keyboard substrate, a limiting member sequentially passes through the first limiting hole and the bottom plate, to slidably connect the keyboard substrate and the bottom plate, and the limiting member slides in the first limiting hole relative to the keyboard substrate when the top plate rotates between the first location and the second location.

10. The keyboard assembly according to claim 9, wherein a folding side is disposed on each of two short sides of the first limiting hole, a pad is disposed on the two folding sides, the pad is provided with a second limiting hole, an extension direction of a long side of the second limiting hole is same as the extension direction of the long side of the first limiting hole, the limiting member sequentially passes through the first limiting hole, the second limiting hole, and the bottom plate, to slidably connect the keyboard substrate and the bottom plate, and the limiting member slides in the second limiting hole relative to the keyboard substrate when the top plate rotates between the first location and the second location.

11. The keyboard assembly according to claim 10, wherein the limiting member comprises a limiting portion and a fastening portion vertically fastened onto the limiting portion, a cross-sectional dimension of the limiting portion is greater than a cross-sectional dimension of the fastening portion, the cross-sectional dimension of the limiting portion is greater than a cross-sectional dimension of a short side of the second limiting hole, and the cross-sectional dimension of the fastening portion is less than the cross-sectional dimension of the short side of the second limiting hole.

12. An electronic device, comprising:

a screen; and a device framework;

wherein the device framework further comprises a top plate, a bottom plate, and a keyboard assembly;

wherein the screen is disposed on the top plate and faces the keyboard assembly, and connected to the device framework in a wired manner or a wireless manner;

wherein the keyboard assembly comprises a keyboard substrate, a keycap array comprising a plurality of keycaps, and a lifting support array comprising a plurality of lifting supports that are one-to-one corresponding to the keycaps, wherein, for each keycap of the plurality of keycaps, a keycap is connected to the keyboard substrate by using a lifting support corresponding to the keycap;

wherein the keyboard substrate is configured to be connected to the bottom plate and the top plate;

wherein the top plate is rotatably connected to the bottom plate;

wherein the bottom plate comprises a plurality of key accommodation grooves one-to-one corresponding to the plurality of keycaps;

wherein each key accommodation groove comprises a concave slope;

wherein the lifting support is located in the key accommodation groove;

wherein one end of the lifting support abuts against the concave slope and is capable of sliding on the concave slope;

wherein in a process in which the top plate rotates to a first location relative to the bottom plate, the top plate drives the keyboard substrate to move relative to the bottom plate, so that each lifting support slides in a first direction on the concave slope, and each lifting support descends, to drive each keycap to descend;

wherein in a process in which the top plate rotates to a second location relative to the bottom plate, the top plate drives the keyboard substrate to move relative to the bottom plate, so that each lifting support slides in a second direction on the concave slope, and each lifting support ascends, to drive each keycap to ascend, thereby increasing a key travel distance of the keycap; and wherein a direction in which the top plate rotates to the first location is opposite to a direction in which the top plate rotates to the second location.

13. The electronic device according to claim 12, wherein when the top plate rotates relative to the bottom plate, the bottom plate remains stationary, and the top plate drives the keyboard substrate to move relative to the bottom plate.

14. The electronic device according to claim 13, wherein a rotating shaft structure is disposed on one side of the top plate, and the top plate is connected to each of the bottom plate and the keyboard substrate by using the rotating shaft structure.

15. The electronic device according to claim 12, wherein the keyboard substrate further comprises a plurality of clamping assemblies, wherein each clamping assembly comprises two first clamping members and two second clamping members, wherein the lifting support comprises a first mount and a second mount connected to the first mount, wherein a first end of the first mount is connected to the first clamping member, wherein a first end of the second mount abuts against the keyboard substrate and is capable of sliding on the keyboard substrate, and can be connected to the second clamping member when one end of the second mount slides to the second clamping member, wherein a second end of the first mount abuts against the keycap and is capable of sliding on the keycap, and wherein a second end of the second mount is connected to the keycap.

16. The electronic device according to claim 15, wherein two side plates are disposed on the first mount;

wherein each side plate is wedge-shaped and comprises a protruding corner that abuts against and matches the concave slope;

wherein in the process in which the top plate rotates to the first location relative to the bottom plate, the top plate drives the keyboard substrate to move relative to the bottom plate, so that each protruding corner slides in the first direction on the concave slope; and wherein in the process in which the top plate rotates to the second location relative to the bottom plate, the top plate drives the keyboard substrate to move relative to the bottom plate, so that each protruding corner slides in the second direction on the concave slope.

17. The electronic device according to claim 16, wherein the bottom plate further comprises a keyboard surface, and when the top plate is at the first location, the keycap is accommodated in the key accommodation groove and is at least lower than or flush with the keyboard surface of the bottom plate.

18. The electronic device according to claim 12, wherein a plurality of first limiting holes are further formed on the keyboard substrate, an extension direction of a long side of a first limiting hole of the plurality of first limiting holes is same as a movement direction of the keyboard substrate, a limiting member sequentially passes through the first limiting hole and the bottom plate, to slidably connect the keyboard substrate and the bottom plate, and the limiting member slides in the first limiting hole relative to the keyboard substrate when the top plate rotates between the first location and the second location.

19. The electronic device according to claim 18, wherein a folding side is disposed on each of two short sides of the first limiting hole, a pad is disposed on the two folding sides, the pad is provided with a second limiting hole, an extension direction of a long side of the second limiting hole is the same as the extension direction of the long side of the first limiting hole, the limiting member sequentially passes through the first limiting hole, the second limiting hole, and the bottom plate, to slidably connect the keyboard substrate and the bottom plate, and the limiting member slides in the second limiting hole relative to the keyboard substrate when the top plate rotates between the first location and the second location.

20. A device framework, comprising:

a top plate;

a bottom plate; and a keyboard assembly;

wherein the keyboard assembly comprises a keyboard substrate, a keycap array comprising a plurality of keycaps, and a lifting support array comprising a plurality of lifting supports that are one-to-one corresponding to the keycaps, wherein, for each keycap of the plurality of keycaps, a keycap is connected to the keyboard substrate by using a lifting support corresponding to the keycap;

wherein the keyboard substrate is configured to be connected to the bottom plate and the top plate;

wherein the top plate is rotatably connected to the bottom plate;

wherein the bottom plate comprises a plurality of key accommodation grooves that are one-to-one corresponding to the plurality of keycaps;

wherein each key accommodation groove comprises a concave slope;

wherein the lifting support is located in the key accommodation groove;

wherein one end of the lifting support abuts against the concave slope and is capable of sliding on the concave slope;

wherein in a process in which the top plate rotates to a first location relative to the bottom plate, the top plate drives the keyboard substrate to move relative to the bottom plate, so that each lifting support slides in a first direction on the concave slope, and each lifting support descends, to drive each keycap to descend;

wherein in a process in which the top plate rotates to a second location relative to the bottom plate, the top plate drives the keyboard substrate to move relative to the bottom plate, so that each lifting support slides in a second direction on the concave slope, and each lifting support ascends, to drive each keycap to ascend, thereby increasing a key travel distance of the keycap; and wherein a direction in which the top plate rotates to the first location is opposite to a direction in which the top plate rotates to the second location.

* * * * *